United States Patent [19]

Koide

[11] Patent Number: 5,542,693
[45] Date of Patent: Aug. 6, 1996

[54] AIR BAG APPARATUS AND METHOD OF REMOVING AN INFLATOR

[75] Inventor: Teruhiko Koide, Aichi-ken, Japan

[73] Assignee: Kabushiki Kaisha Tokai-Rika-Denki-Seisakusho, Aichi-ken, Japan

[21] Appl. No.: 393,476

[22] Filed: Feb. 24, 1995

[30] Foreign Application Priority Data

Mar. 15, 1994  [JP]  Japan .................................. 6-044007

[51] Int. Cl.$^6$ ...................................................... B60R 21/16
[52] U.S. Cl. ........................................ 280/728.2; 280/741
[58] Field of Search ............................ 280/728.20, 741, 280/736, 731, 732

[56] References Cited

U.S. PATENT DOCUMENTS

| 5,141,247 | 8/1992 | Barth | 280/728.2 |
| 5,423,568 | 6/1995 | Zushi et al. | 280/728.2 |
| 5,427,406 | 6/1995 | Zushi et al. | 280/728.2 |

FOREIGN PATENT DOCUMENTS

| 5270368 | 10/1993 | Japan . | |
| 5270341 | 10/1993 | Japan | 280/728.2 |
| 6144146 | 5/1994 | Japan . | |
| 6144144 | 5/1994 | Japan . | |
| 2218183 | 8/1989 | United Kingdom . | |
| 2265337 | 9/1993 | United Kingdom | 280/728.2 |

*Primary Examiner*—Christopher P. Ellis
*Attorney, Agent, or Firm*—Sixbey, Friedman, Leedom & Ferguson

[57] ABSTRACT

An air bag apparatus in which a plurality of insertion portions are formed in a connecting member for fixing an inflator to a supporting member. A plurality of bolts are inserted into the plurality of insertion portions. When the plurality of bolts move in a direction of insertion thereof, the inflator is released from a state of being fixed to the supporting member. The air bag apparatus also includes a stress concentrating portion which easily deforms due to force, which is applied to the supporting member from an exterior, concentrating at the stress concentrating portion. When a substantially central portion of the air bag apparatus having the above-described structure is pressed along a direction in which the plurality of bolts are inserted, the stress concentrating portion deforms, and simultaneously, the plurality of bolts respectively moves within corresponding insertion portions in a direction which intersects an axial direction of the plurality of bolts, so that the inflator is removed from the supporting member. This results in reduction in time and labor required for removal of the inflator.

15 Claims, 6 Drawing Sheets

AIR BAG APPARATUS AND METHOD OF REMOVING AN INFLATOR

BACKGROUND OF THE INVENTION

1. Field Of The Invention

The present invention relates to an air bag apparatus which operates to inflate a bag body at the time of sudden deceleration of a vehicle, and to a method of removing an inflator provided in the air bag apparatus.

2. Description of the Related Art

Generally, air bag apparatuses are known as occupant protecting apparatuses. Such an air bag apparatus is adapted to detect a state of sudden deceleration of a vehicle by a sensor and inflate a bag body so as to protect an occupant at the time of sudden deceleration of the vehicle.

Namely, at the time of sudden deceleration of the vehicle, a sensor of an inflator which is contained in the air bag apparatus detects this state of sudden deceleration. When this sensor causes a detonator to ignite so that a gas generating material combusts, the generated gas is fed from the inflator into the bag body and the bag body inflates.

On the other hand, when the vehicle is scrapped, it is necessary to discard an air bag apparatus which has not been operated. In this case, after the inflator is removed from the air bag apparatus and is forcibly actuated, it is necessary to chemically treat cinders or the like to make them harmless. Therefore, it is preferable that the inflator be easily removed.

Further, in order to recycle parts other than the inflator, which are formed from steel plates, resins and the like, the inflator is desirably assembled in such a manner as to be easily removed from the air bag apparatus.

However, in many cases, the inflator is attached to the air bag apparatus by being fastened by bolts and nuts which are both painted for fixing, so that the inflator might not be removed intentionally for purposes other than disposal or might not be loosened due to vibrations or the like. For this reason, there exists a drawback in that a great deal of time and labor are required to remove the inflator from the air bag apparatus.

SUMMARY OF THE INVENTION

In view of the aforementioned, it is an object of the present invention to provide an air bag apparatus in which removal of an inflator is facilitated.

A first aspect of the present invention is an air bag apparatus, which comprises: an inflator provided so as to enable a bag body to inflate; a supporting member which supports the inflator; a plurality of bolts inserted through the inflator and the supporting member; a connecting member which is formed at the inflator and which fixes the inflator to the supporting member by the plurality of bolts being inserted through the connecting member; a plurality of insertion portions which are provided in the connecting member and through which the plurality of bolts are inserted, the plurality of insertion portions causing the inflator to be released from a state of being fixed to the supporting member when the plurality of bolts move in a direction perpendicular to a direction in which the plurality of bolts are inserted through the plurality of insertion portions; and a stress concentrating portion which is provided at the supporting member and which is formed so as to easily deform due to force, which is applied to the supporting member from an exterior, concentrating at the stress concentrating portion.

A second aspect of the present invention is an air bag apparatus which comprises: an inflator provided so as to enable a bag body to inflate; a supporting member which supports the inflator; a plurality of bolts respectively inserted through the inflator and the supporting member; a connecting member which is formed in the inflator and which fixes the inflator to the supporting member by the plurality of bolts being inserted through the connecting member; and a plurality of insertion portions which are provided in the connecting member and through which the plurality of bolts are inserted, the plurality of insertion portions causing the inflator to be released from a state of being fixed to the supporting member when the supporting member and the inflator rotate relatively around the center of the inflator such that the plurality of bolts move.

A third aspect of the present invention is a method of removing an inflator, which comprises the steps of: using an air bag apparatus comprising: an inflator provided so as to enable a bag body to inflate; a supporting member which supports the inflator; a plurality of bolts respectively inserted through the inflator and the supporting member; a connecting member which is formed at the inflator and which fixes the inflator to the supporting member by the plurality of bolts being inserted through the connecting member; a plurality of insertion portions which are provided in the connecting member and into which the plurality of bolts are inserted, the plurality of insertion portions causing the inflator to be released from a state of being fixed to the supporting member when the plurality of bolts move in a direction perpendicular to a direction in which the plurality of bolts are inserted through the plurality of insertion portions; and a stress concentrating portion which is provided at the supporting member and which is formed so as to easily deform due to force, which is applied to the supporting member from an exterior, concentrating at the stress concentrating portion; removing the air bag apparatus from a vehicle; pressing a substantially central portion of the air bag apparatus along a direction in which the plurality of bolts are inserted through the plurality of insertion portions; and removing the inflator from the supporting member.

A fourth aspect of the present invention is a method of removing an inflator, which comprises the steps of: using an air bag apparatus comprising: an inflator provided so as to enable a bag body to inflate; a supporting member which supports the inflator; a plurality of bolts respectively inserted through the inflator and the supporting member; a connecting member which is formed at the inflator and which fixes the inflator to the supporting member by the plurality of bolts being inserted through the connecting member; and a plurality of insertion portions which are provided in the connecting member and through which the plurality of bolts are inserted, the plurality of insertion portions causing the inflator to be released from a state of being fixed to the supporting member when the supporting member and the inflator rotate relatively around the center of the inflator such that the plurality of bolts move; removing the air bag apparatus from a vehicle; causing the supporting member and the inflator to rotate relatively around the center of the inflator; and removing the inflator from the supporting member.

Operation of the air bag apparatus in accordance with the first aspect of the present invention will be described below.

The inflator constructed so as to enable the bag body to inflate is provided with the connecting member having the plurality of insertion portions through which the plurality of bolts are inserted. The inflator is screwed to the supporting member by the plurality of bolts inserted through the connecting member. The stress concentrating portion which is adapted to easily deform due to force applied from the exterior concentrating thereat, is formed in the supporting member.

Accordingly, when force is applied to the supporting member from the exterior, this force concentrates at the stress concentrating portion and the stress concentrating portion deforms. The deformation of the stress concentrating portion causes the plurality of bolts to move within the corresponding insertion portions in directions which intersect the axial direction of the plurality of bolts, so that the plurality of bolts are removed from respective ones of ends of the corresponding insertion portions. As a result, the inflator is separated from the supporting member.

As described above, even if the inflator is mounted to the supporting member by the bolts and nuts which are both painted for fixing, removal of the inflator from the air bag apparatus does not require much time and labor.

Next, operation of the air bag apparatus in accordance with the second aspect of the present invention will be described below.

The connecting member is formed on an outer periphery of the inflator constructed so as to enable the bag body to inflate. The connecting member includes the plurality of circular-arc-shaped insertion portions, through which the plurality of bolts are inserted. Further, the inflator is screwed to the supporting member by the plurality of bolts inserted through the connecting member.

Accordingly, when a rotating force is applied to the inflator or to the supporting member from the exterior, the rotating force causes the inflator and the supporting member to rotate relatively, so that the plurality of bolts respectively move within the corresponding circular-arc-shaped opening portions along the circular arcs. Then, the plurality of bolts are removed from the connecting member so that the inflator is separated from the supporting member.

As described above, in the same way as the first aspect, even if the inflator is mounted to the supporting member by bolts and nuts which are both painted for fixing, removal of the inflator from the air bag apparatus does not require much time and labor.

In accordance with the third aspect of the present invention, the plurality of insertion portions are formed in the connecting member provided in the inflator. Further, the stress concentrating portion is provided in the supporting member. When the substantially central portion of the air bag apparatus having the structure described above is pressed along the direction in which the plurality of bolts are inserted, the stress concentrating portion deforms. The deformation of the stress concentrating portion causes the plurality of bolts to respectively move within the corresponding insertion portions in directions which intersect the axial direction of the plurality of bolts, so that the inflator is removed from the supporting member. This results in reduction in time and labor required for the removal of the inflator.

In accordance with the fourth aspect of the present invention, the plurality of insertion portions are formed in the connecting member provided in the inflator. When the plurality of bolts are inserted through the connecting member and the supporting member and the inflator rotate relatively around the center of the inflator, the inflator can be released from the state of being fixed to the supporting member. In the air bag apparatus having the structure described above, when the supporting member and the inflator rotate relatively around the center of the inflator, the plurality of bolts are removed from the connecting member and the inflator is separated from the supporting member. This results in reduction in time and labor required for removal of the inflator.

DESCRIPTION OF THE PREFERRED EMBODIMENTS

Figure 1:
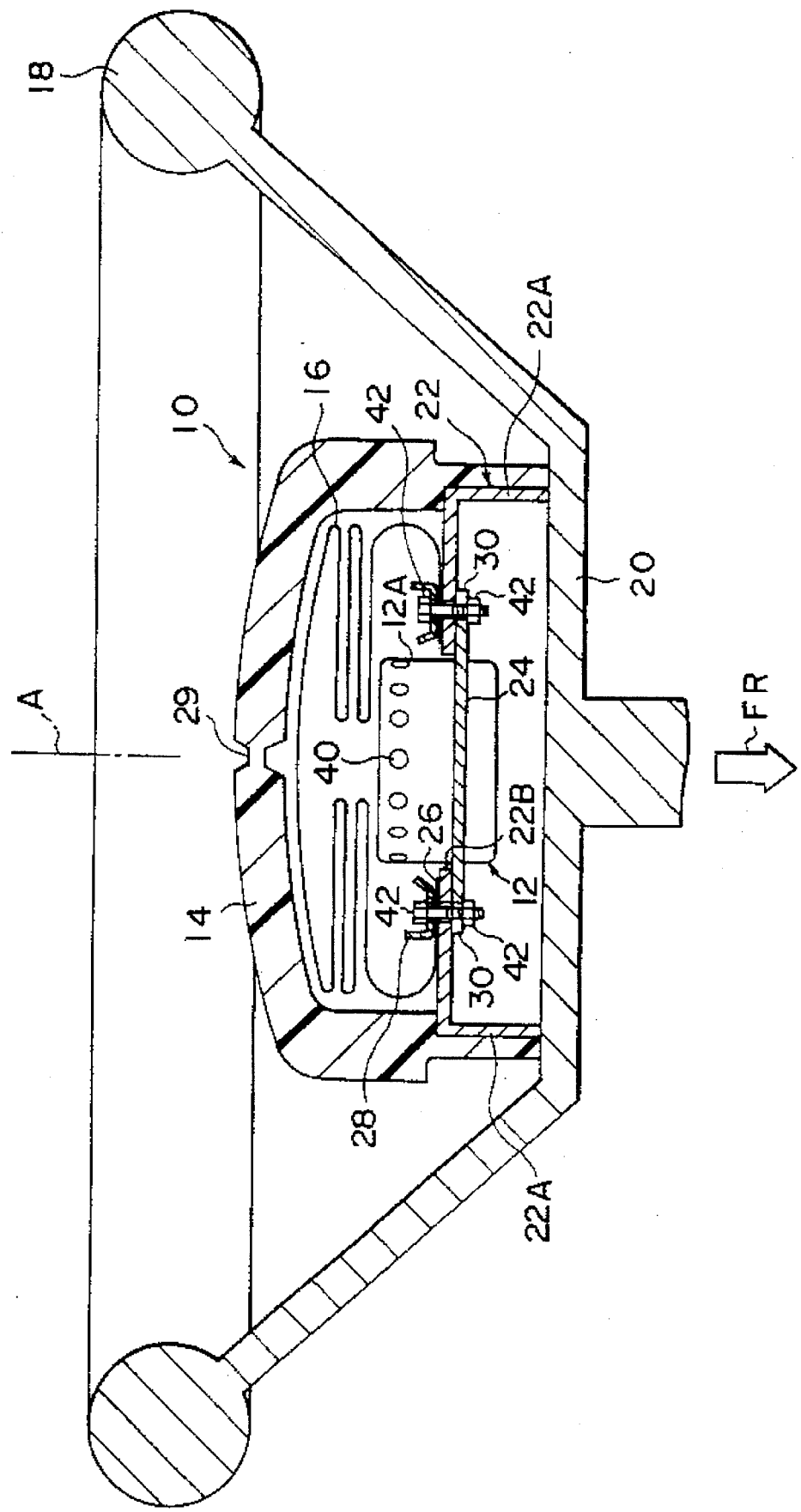
FIG. 1 is a cross-sectional view of an air bag apparatus according to a first embodiment of the present invention, which is taken along a longitudinal direction of a vehicle.
Figure 2:
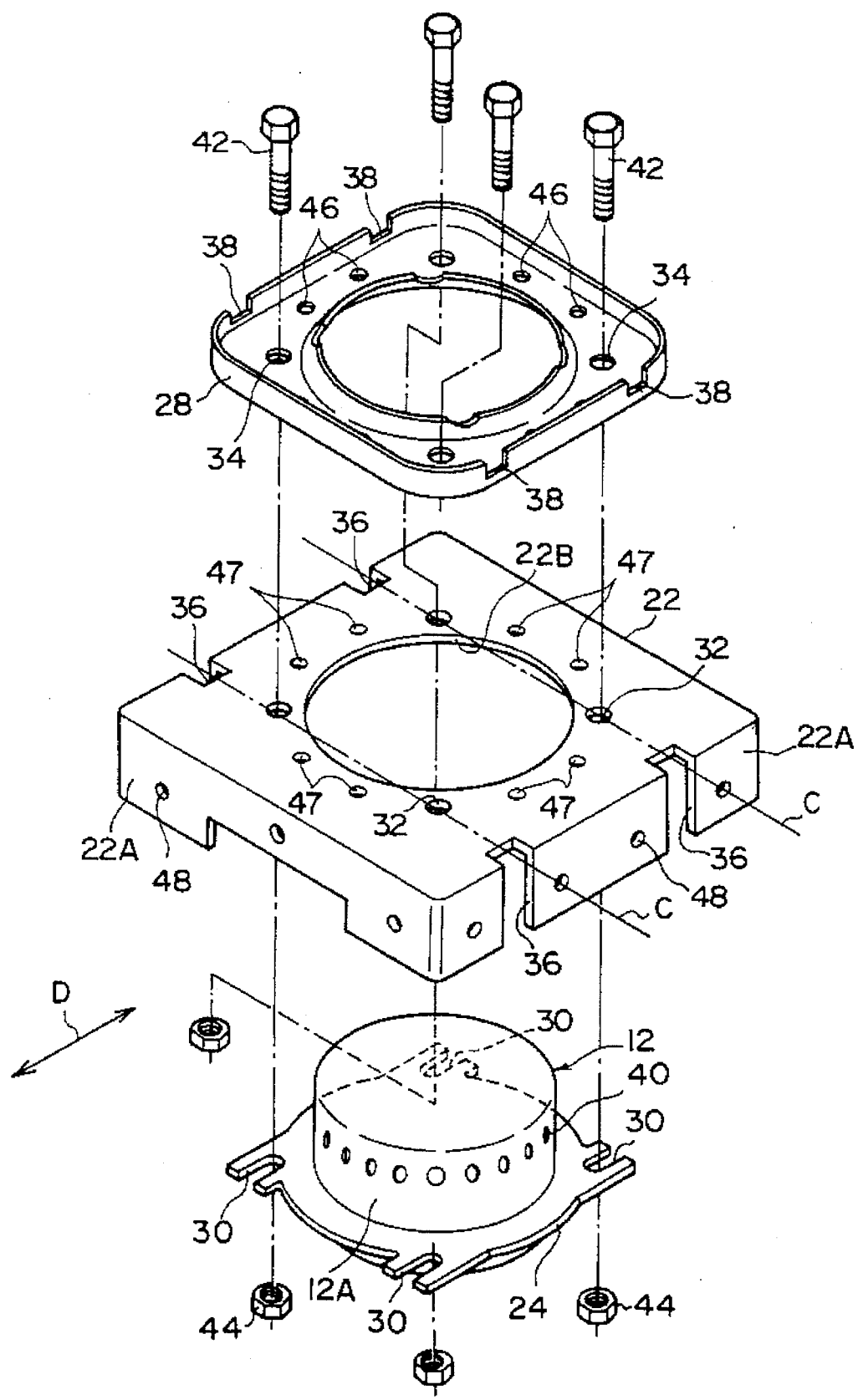
FIG. 2 is an exploded perspective view of the air bag apparatus according to the first embodiment (not including a cover and a bag body).
Figure 3:
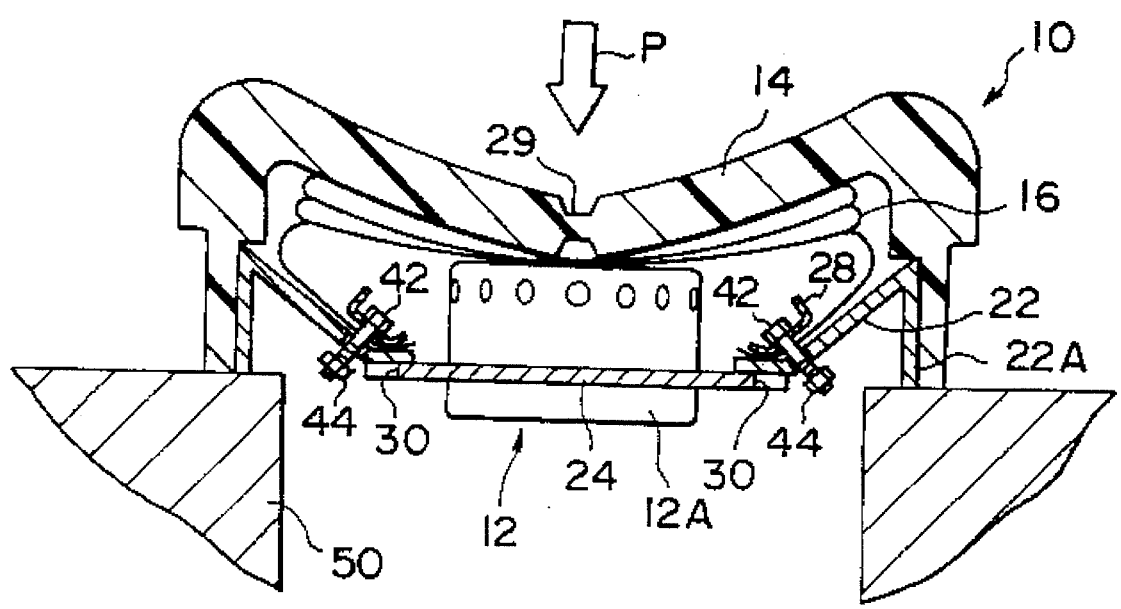
FIG. 3 is a cross-sectional view of the air bag apparatus according to the first embodiment, taken along the longitudinal direction of the vehicle, which illustrates a state in which the air bag apparatus is mounted on a working table.

Referring now to FIG. 1 through FIG. 3, a description will be given of an air bag apparatus according to a first embodiment of the present invention.

FIG. 1 illustrates an air bag apparatus 10 (it should be noted that arrow "FR" represents the forward direction of a vehicle). The air bag apparatus 10 is equipped with an inflator 12, a cover 14, an air bag body 16 (which will be hereinafter referred to simply as a bag body 16), and a base plate 22. The air bag apparatus 10 is mounted to the vehicle in a state in which the base plate 22 is supported by a hub 20 of a steering wheel 18.

As shown in FIGS. 1 and 2, a main body portion 12A of the inflator 12 is formed into a cylindrical shape which is coaxial with an axial line of rotation A of the steering wheel 18. Further, a mounting flange 24 serving as a connecting portion projects from a circumferential surface of the main body portion 12A at an intermediate portion of the inflator 12 in a vertical direction thereof along the axial line of rotation A.

Concave portions 30 each having a substantially U-shaped configuration are formed in the mounting flange 24. The concave portions 30 each serve as an insertion portion for screwing, and respectively open at the lower left end sides and upper right end sides thereof (i.e., in directions indicated by the double-headed arrow D) in FIG. 2. As illustrated in FIGS. 1 and 2, a bolt 42 is inserted into each of the concave portions 30.

The base plate 22 which is a supporting member is positioned above the mounting flange 24. The base plate 22 is provided with a wall portion 22A which has a square configuration when seen from the forward direction of the vehicle and which extends from the respective side end portions of the base plate 22, which end portions are in directions perpendicular to the axial line of rotation A. The wall portion 22A extends in the "FR" direction substantially along the axial line of rotation A. The main body portion 12A of the inflator 12 can be inserted into a hole portion 22B formed at a central portion of the base plate 22.

Through holes 32, through which the bolts 42 respectively pass, are formed in the vicinity of the hole portion 22B of the base plate 22. Further, notched portions 36 are provided in the vicinity of the through holes 32 in sides of the base plate 22 which oppose each other and in the wall portion 22A extending from these sides. Each of the notched portions 36 is a stress concentrating portion which easily deforms due to force, which is applied to the base plate 22 from the exterior, concentrating at the stress concentrating portion.

In addition, a mounting ring 28 is disposed on an upper surface of the base plate 22 (i.e., the surface in the direction opposite to the "FR" direction). The mounting ring 28 is formed in the shape of a ring and has through holes 34 at positions which correspond to the through holes 32 of the base plate 22 respectively. Notched portions 38 each having the same width as the notched portions 36 are formed in the mounting ring 28 at positions which correspond to the notched portions 36 of the base plate 22.

The bag body 16 is disposed in a folded state at a vehicle occupant side of the base plate 22 and the mounting ring 28. The bag body 16 is fixed to the base plate 22 in a state in which a peripheral edge of an opening portion 26 of the bag body 16 is caught between the mounting ring 28 and the base plate 22 and is fastened by rivets (not shown) inserted into rivet holes 46, 47 which are respectively formed in the mounting ring 28 and the base plate 22.

As shown in FIG. 1, an upper side of the inflator 12 along the axial line of rotation A with respect to the mounting flange 24 passes through the base plate 22 and the mounting ring 28 and projects toward the vehicle occupant. As a result, the upper side of the inflator 12 is disposed in a state of being inserted within the bag body 16, and a plurality of gas holes 40 of the inflator 12 respectively open in such a manner as to face an inner side of the bag body 16.

As described above, as shown in FIGS. 1 and 2, when the bolts 42 are respectively inserted into the through holes 32, 34 and the concave portions 30 and are screwed with the nuts 44, the bag body 16, the mounting ring 28 and the mounting flange 24 of the inflator 12 are fixed to the base plate 22. Further, the inflator 12 is fixed to the base plate 22 via the mounting flange 24.

Further, the cover 14 is formed into the shape of a bowl and is fixed in a state in which an opening edge of the cover 14 is screwed by unillustrated screws at screw holes 48 formed in the wall portion 22A of the base plate 22. As a result, the bag body 16 is accommodated between the cover 14 and the base plate 22. A thin-walled portion 29 is formed in a bottom wall of the cover 14 which faces the occupant. When the bag body 16 inflates, the thin-walled portion 29 is broken and the cover 14 opens from its central portion in a manner similar to a double-leafed hinged door so that the bag body 16 is set in an expandable state.

Further, an enhancer, a detonator, a gas generating material, an acceleration sensor and the like (none of which is illustrated) are accommodated in the inflator 12. At the time of sudden deceleration of the vehicle, an ignition pin of the acceleration sensor strikes and ignites the detonator. The gas generating material combusts due to the ignition of the detonator and gas is generated. When the generated gas is supplied into the bag body 16 via the gas holes 40, the bag body 16 inflates. In this way, the inflator 12 is adapted to be capable of inflating the bag body 16.

Next, operation of the first embodiment will be described.

At the time of scrapping the vehicle, the air bag apparatus 10 which has not been operated is removed from the hub 20 of the steering wheel 18.

As shown in FIG. 3, when the air bag apparatus 10 is placed on the working table 50 and a predetermined load P is applied to the central portion of the cover 14, the cover 14 pushes the inflator 12. As a result, force is applied to the base plate 22 via the inflator 12. When force is applied to the base plate 22 in this way, the applied force concentrates at the notched portions 36, 38 and the notched portions 36, 38 deform in such a manner as to bend along line segments C indicated in FIG. 2. Together with the deformation of the notched portions 36, 36, the intervals between the bolts 42 which are respectively inserted into the concave portions 30 of the mounting flange 24 widen, and each bolt 42 moves within the concave portion 30 in a direction which intersects an axial direction of the bolt 42. As a result, each bolt 42 is removed from the end of the concave portion 30 which is the open end thereof, and the inflator 12 is separated from the base plate 22.

For this reason, for example, even if the inflator 12 is mounted to the base plate 22 by the bolts 42 and the nuts 44 which are both painted for fixing, removal of the inflator 12 from the air bag apparatus 10 does not require much time and labor.

Namely, conventionally, a manual operation for removing the four bolts 42 and nuts 44 has been required. However, in the present invention, the inflator 12 can be removed from the air bag apparatus 10 by merely pushing the central portion of the cover 14 and deforming the air bag apparatus 10 itself. This makes application to an automatic disassembling operation possible, so that reduction in cost for disassembly of the air bag apparatus would be anticipated.

It should be noted that, the load P for deforming the air bag apparatus is set to a value of a load which cannot easily be imparted by vehicle users or other people lacking predetermined equipment therefor.

Next, an inflator of an air bag apparatus according to a second embodiment of the present invention will be described with reference to FIG. 4. It should be noted that the same members as those of the first embodiment will be denoted by the same reference numerals, and a description thereof will be omitted.

Figure 4:
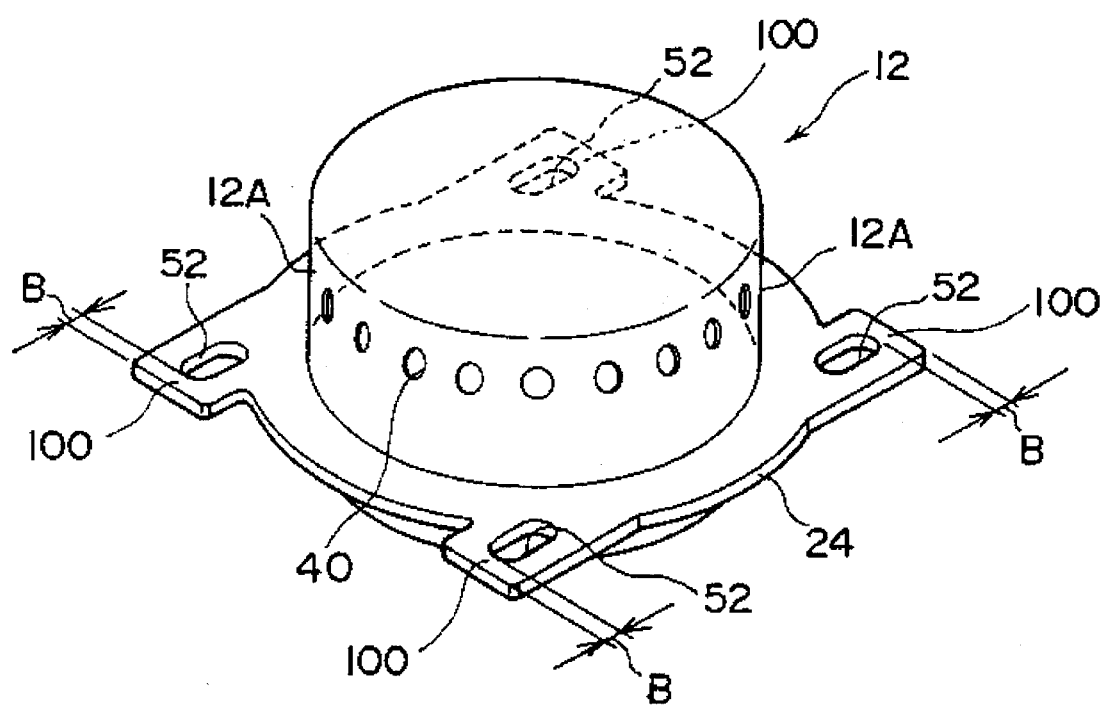
FIG. 4 is a perspective view showing an inflator of an air bag apparatus according to a second embodiment of the present invention.

As shown in FIG. 4, oblong holes 52 for screwing are formed in the mounting flange 24 of the inflator 12. These oblong holes 52 each extend along a direction perpendicular to the line segments C (see FIG. 2) which are bending portions. In the same way as the first embodiment, the bolts 42 are respectively inserted into the oblong holes 52.

Since a fragile portion 100 disposed between one end of the oblong hole 52 and an outer peripheral end of the mounting flange 24 has a small dimension B, the fragile portion 100 can easily be broken off.

As described above, in the same way as the first embodiment, when the air bag apparatus 10 is placed on the working table 50 and the predetermined load P is applied to the central portion of the cover 14, the cover 14 pushes the inflator 12. Therefore, force is applied to the base plate 22, and the notched portions 36, 38 deform (bend). As the notched portions 36, 38 deform, the intervals between the bolts 42 which are respectively inserted into the oblong holes 52 of the mounting flange 24 widen, and each of the bolts 42 moves relatively within the oblong hole 52 in the direction which intersects the axial direction of the bolt 42 and is removed by breaking one end of the oblong hole 52 near the outside. As a result, the inflator 12 is separated from the base plate 22.

In the same way as the first embodiment, removal of the inflator 12 from the air bag apparatus 10 does not require much time and labor.

It should be noted that, in the second embodiment, it suffices to form only portions of the mounting flange 24, which are indicated by dimensions B, as thin walls such that these portions are easily broken.

Next, an inflator of an air bag apparatus according to a third embodiment of the present invention will be described with reference to FIG. 5. It should be noted that the same members as those of the first embodiment will be denoted by the same reference numerals, and a description thereof will be omitted. In the third embodiment, a base plate 122 shown in FIG. 6 is used instead of the base plate 22 of the first and second embodiments.

Figure 5:
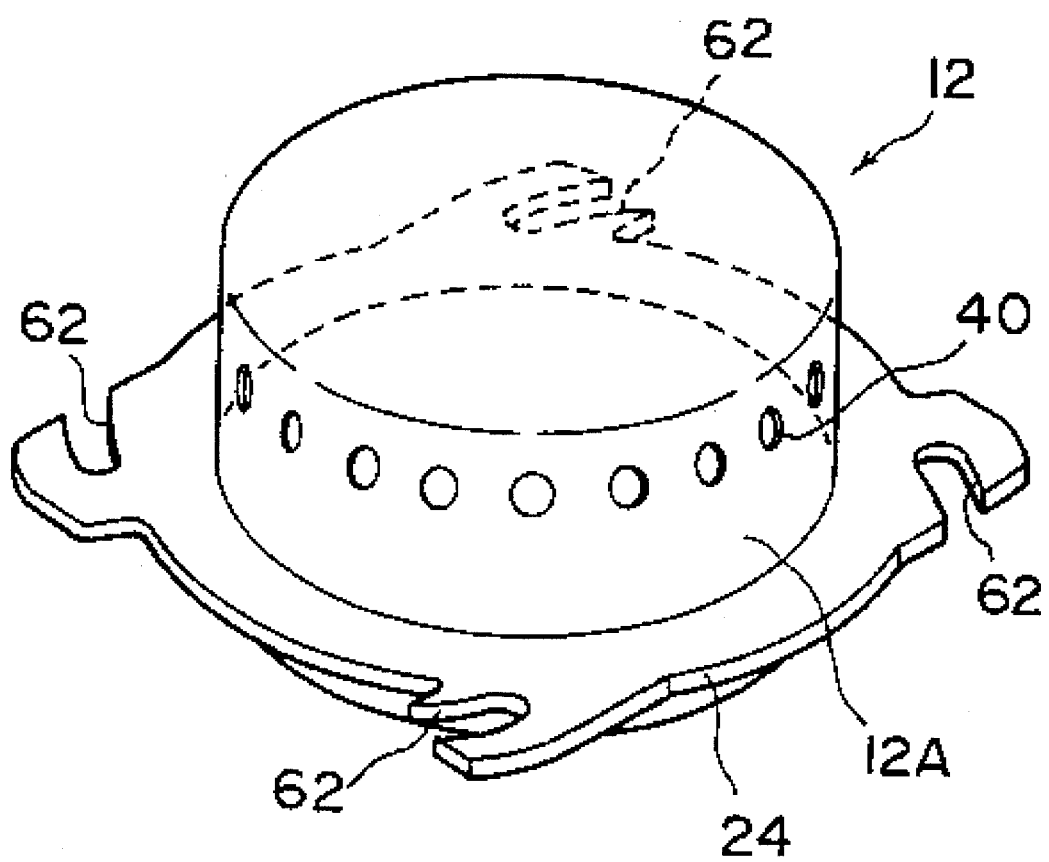
FIG. 5 is a perspective view showing an inflator of an air bag apparatus according to a third embodiment of the present invention.
Figure 6:
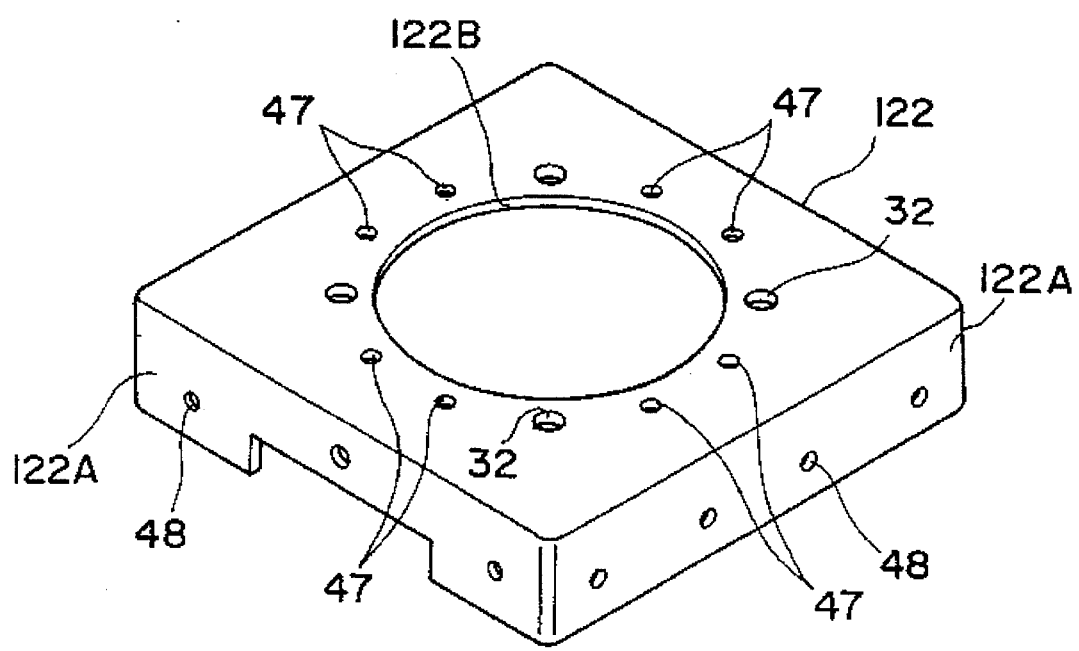
FIG. 6 is a perspective view showing a base plate which is used in the air bag apparatus according to the third embodiment.

As shown in FIG. 5, in the third embodiment, the mounting flange 24 serving as a connecting portion projects from an outer periphery of the main body portion 12A of the inflator 12 at an intermediate portion of the inflator 12 in a vertical direction thereof along the axial line of rotation A. In FIG. 5, concave portions 62 are formed in the mounting flange 24. Each of the concave portions 62 has one open end and is formed in the shape of a circular arc disposed along the same circle whose center is also a central portion of the inflator 12. The bolts 42 are respectively inserted through the concave portions 62. Accordingly, the inflator 12 is screwed to the base plate 22 by the bolts 42 which are respectively inserted through the concave portions 62 of the mounting flange 24.

As described above, at the time of scrapping the vehicle, the air bag apparatus 10, which has not been operated, is removed from the hub 20 of the steering wheel 18. Either the inflator 12 or the base plate 122 is fixed, and a rotating force is applied to the other of the inflator 12 and the base plate 122 (i.e., to the member which is not fixed) from the exterior. In this way, the inflator 12 and the base plate 122 rotate relatively, and the bolts 42 respectively move along the concave portions 62 each having the shape of a circular arc. As a result, the bolts 42 are removed from the mounting flange 24 of the inflator 12 and the inflator 12 is separated from the base plate 122.

For this reason, in the same manner as the first embodiment, removal of the inflator 12 from the air bag apparatus 10 does not require much time and labor.

In the first embodiment, the notched portions 36 are used as the stress concentrating portions. However, instead of the notched portions 36, portions of the base plate 22 corresponding to the notched portions 36 may be formed as thin-walled portions such that force easily concentrates at these thin-walled portions. Further, the number of the notched portions 36 may be different from the number thereof in the above-described embodiment, and may be one, or three or more for each of the opposing sides of the base plate 22.

Further, although the base plate 22 may be manufactured by press-working a steel plate such that the base plate 22 can easily be deformed by the load P, the present invention is not limited to the same. For example, the base plate 22 may also be manufactured by cutting work.

In addition, the notched portions 38, like the notched portions 36, are formed in the mounting ring 28. However, it suffices that the notched portions 38 are not formed in the mounting ring 28 provided that the mounting ring 28 can be deformed by the load P.

Further, it is to be understood that the present invention is not limited to each of the above-described embodiments and that various changes and modifications may be made. For example, in each of the above-described embodiments, although the air bag apparatus 10 is shown as an occupant protecting apparatus, the present invention is not limited to the same. The present invention is also applicable to an apparatus which actuates a preloader in a webbing retracting apparatus so as to cause a webbing to be closely applied to a vehicle occupant at the time of sudden deceleration of the vehicle.

The air bag apparatus according to the present invention has an excellent effect in that it is possible to easily remove the inflator therefrom.

What is claimed is:

1. An air bag apparatus comprising:

an inflator provided so as to enable a bag body to inflate including a connecting member;

a supporting member which supports said inflator;

a plurality of bolts inserted through the connecting member of said inflator and said supporting member;

a plurality of insertion portions which are provided in said connecting member and through which said plurality of bolts are inserted, said plurality of insertion portions causing said inflator to be released from a state of being fixed to said supporting member when said plurality of bolts move in a direction perpendicular to a direction in which said plurality of bolts are inserted through said plurality of insertion portions; and a stress concentrating portion which is provided at said supporting member and which is formed so as to easily deform in response to force exteriorly applied to said supporting member.

2. An air bag apparatus according to claim 1, wherein said plurality of insertion portions are concave portions which are respectively depressed along said direction perpendicular to said direction in which said plurality of bolts are inserted.

3. An air bag apparatus according to claim 2, wherein said stress concentrating portion is provided so as to bend around an axis which runs along a direction substantially perpendicular to said direction in which said concave portions are depressed.

4. An air bag apparatus according to claim 3, wherein said stress concentrating portion is provided at end portions of said supporting member and on said axis of said supporting member.

5. An air bag apparatus according to claim 1, wherein said plurality of insertion portions are oblong hole portions which respectively extend in said directions substantially perpendicular to the directions in which said plurality of bolts are inserted.

6. An air bag apparatus according to claim 5, wherein said connecting member includes weak portions in longitudinal directions of said oblong hole portions and respectively formed from one end portion of each of said oblong hole portions in a longitudinal direction thereof to an outer periphery of said connecting member.

7. An air bag apparatus according to claim 6, wherein said weak portion is formed as a thin wall.

8. An air bag apparatus according to claim 5, wherein said stress concentrating portion is provided so as to bend around an axis of said supporting member which runs along a direction substantially perpendicular to a longitudinal direction of said oblong hole portion.

9. An air bag apparatus according to claim 8, wherein said stress concentrating portion is provided at end portions of said supporting member and on said axis of said supporting member.

10. An air bag apparatus according to claim 1, wherein said stress concentrating portion deforms such that intervals between said plurality of bolts widen when said force is applied from the exterior.

11. An air bag apparatus according to claim 1, further comprising a mounting ring which is provided at an opposite side of said inflator with respect to said supporting member, said mounting ring and said supporting member sandwiching the bag body.

12. An air bag apparatus according to claim 11, wherein said mounting ring includes a notched portion at a position corresponding to said stress concentrating portion and is formed so as to easily deform due to said force, from an exterior, concentrating at the notched portion.

13. An air bag apparatus according to claim 12, wherein said supporting member includes a wall member at respective end portions of said supporting member in said direction perpendicular to said direction in which said plurality of bolts are inserted, and said stress concentrating portion is provided in said wall member.

14. A method of removing an inflator, comprising the steps of:

using an air bag apparatus comprising: an inflator provided so as to enable a bag body to inflate including a connecting member; a supporting member which supports said inflator; a plurality of bolts respectively inserted through said inflator and said supporting member and through said connecting member; a plurality of insertion portions which are provided in said connecting member and through which said plurality of bolts are inserted, said plurality of insertion portions causing said inflator to be released from a state of being fixed to said supporting member when said plurality of bolts move in a direction perpendicular to a direction in which said plurality of bolts are inserted through said plurality of insertion portions; and a stress concentrating portion which is provided at said supporting member and which is formed so as to easily deform due to force, which is applied to said supporting member from an exterior, concentrating at said stress concentrating portion;

removing said air bag apparatus from a vehicle;

pressing a substantially central portion of said air bag apparatus along a direction in which said plurality of bolts are inserted through said plurality of insertion portions; and removing said inflator from said supporting member.

15. A method of removing an inflator according to claim 14, wherein said pressing of said air bag apparatus is effected in such a manner that said stress concentrating portion deforms and intervals between said plurality of bolts widen.

* * * * *